Nov. 8, 1955 — S. STEIN — 2,722,848
BALANCING DEVICE FOR ROTARY MEMBERS
Filed April 2, 1952 — 3 Sheets-Sheet 1

INVENTOR.
Samuel Stein.
BY
ATTORNEYS.

Nov. 8, 1955  S. STEIN  2,722,848
BALANCING DEVICE FOR ROTARY MEMBERS
Filed April 2, 1952  3 Sheets-Sheet 2

INVENTOR.
Samuel Stein.
BY
ATTORNEYS.

Nov. 8, 1955 S. STEIN 2,722,848
BALANCING DEVICE FOR ROTARY MEMBERS

Filed April 2, 1952 3 Sheets-Sheet 3

INVENTOR.
Samuel Stein.
BY
D. C. Snyder
A. R. McCrady
ATTORNEYS.

United States Patent Office 2,722,848
Patented Nov. 8, 1955

2,722,848

BALANCING DEVICE FOR ROTARY MEMBERS

Samuel Stein, Cleveland, Ohio

Application April 2, 1952, Serial No. 280,152

2 Claims. (Cl. 74—573)

(Granted under Title 35, U. S. Code (1952), sec. 266)

The invention described herein may be manufactured and used by or for the Government of the United States of America for governmental purposes without the payment of any royalties thereon or therefor.

This invention relates to a device for balancing rotary members such as shafts, and more particularly to a device for balancing a rotary member while the same remains in situ in a relatively inaccessible position.

The device as illustrated and described is applied to a propeller shaft of a naval vessel, although it will be clear that it is not limited to such use. In a high speed naval vessel such as a destroyer, a very slight unbalance of a rotating assembly, such as a propeller with its shaft, causes a considerable vibration, because of the great weight of the assembly and the high speed at which it must rotate. Correction of such unbalance is difficult because of the inaccessibility of the parts once installed.

The present invention aims to provide a balancing mechanism to be incorporated in the propeller as installed. When the propeller is then driven at predetermined speed, the mechanism adjusts itself automatically to correct the unbalance, and is then set by remote control mechanism, while the propeller is still rotating, to retain its adjusted position.

As applied to a more complex mechanism such as an internal combustion engine, the invention may make use of a rotating liquid body which so disposes its weight as to balance the assembly, and is then congealed into solid form so as to permanently maintain the balance. In another form of the invention, an engine or the like is balanced by rotatable weights.

An object of the invention is to provide an improved device for balancing rotary members of the types indicated.

Other objects and many of the attendant advantages of this invention will be readily appreciated as the same becomes better understood by reference to the following description.

Figure 1:
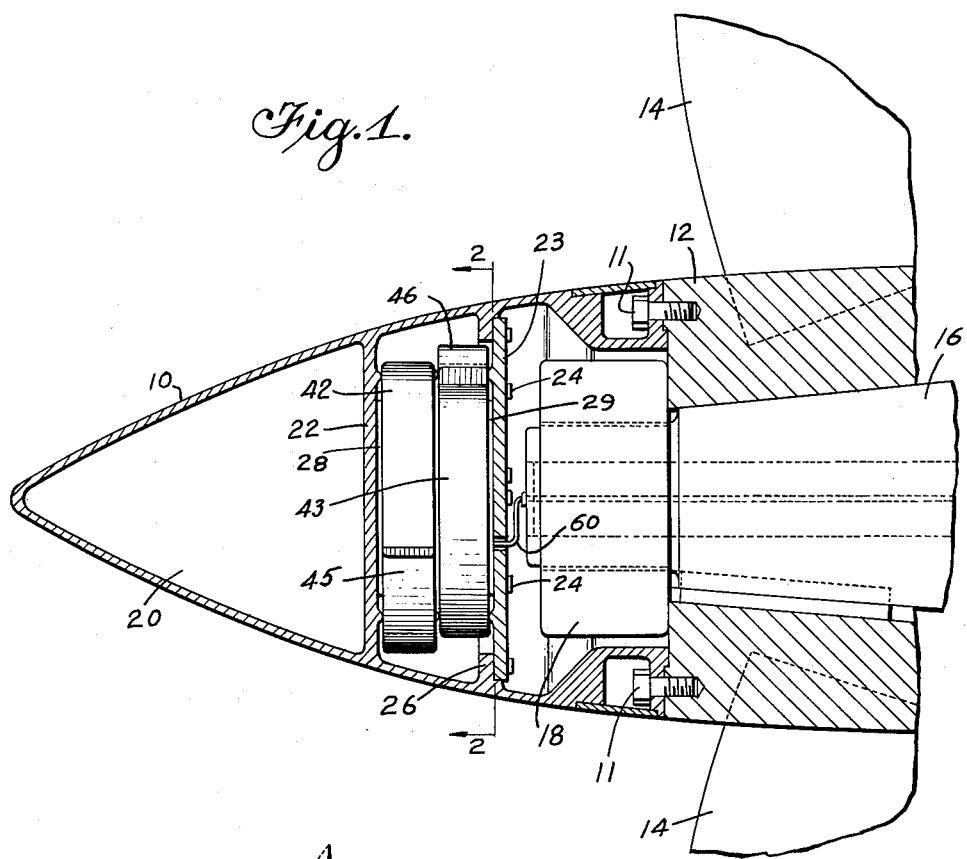
Fig. 1 is a fragmentary view in longitudinal section of a propeller mechanism including a balancer embodying the invention.
Figure 2:
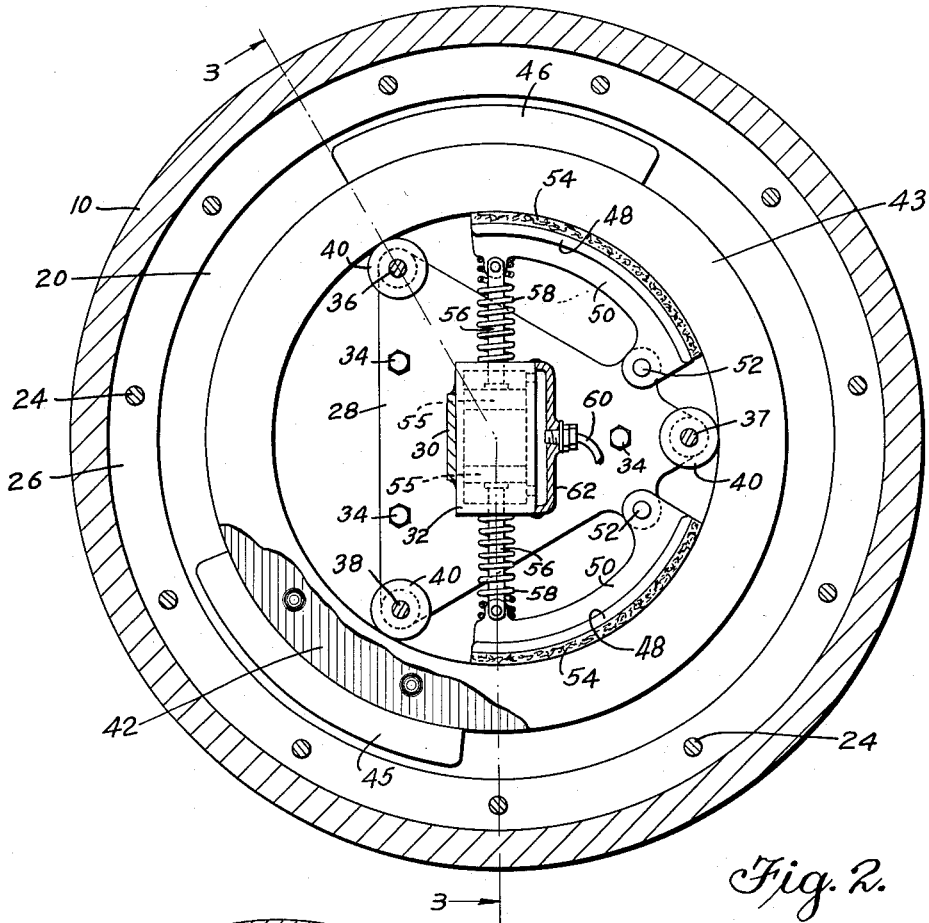
Fig. 2 is a transverse section taken on the line 2—2 of Fig. 1.

The propeller shown in Figs. 1 and 2 comprises an ogival shell 10 which is secured by means of bolts 11 to a body 12 in which are mounted propeller blades 14. A propeller shaft having a tapered rear end 16 is fixed to the propeller by means of a retaining nut 18. The propeller shaft is journaled in a bearing, not shown, and for purposes of this description it is assumed that a dynamic unbalance exists in the propeller assembly relative to said bearing, so that upon rotation the assembly will exert a periodic lateral force upon the bearing. The mechanism thus far described is old, and all of the parts thus far described rotate in unison with the propeller shaft.

Within the tapered cavity 20 formed by shell 10 to the rear of retaining nut 18 are mounted two spaced walls 22, 23, the latter being removably secured in place by any suitable means such as bolts 24 engaging an annular flange 26 on the interior wall of shell 10. Between the two walls is mounted the balancing head now to be described.

The balancing head comprises two generally triangular vertical plates 28, 29, held rigidly in spaced parallel relation by means of a strut 30 which has its ends welded to the plates and its middle welded to a hydraulic cylinder 32, described hereinafter. The plate 28 is removably secured to wall 22 by bolts 34. At each of their three corners the plates 28, 29 are connected together by spindles 36, 37, 38, upon each of which are rotatably mounted two rollers 40 spaced longitudinally from each other as shown, and rotatable independently of each other upon the spindles.

Upon the rollers 40 are mounted two parallel carrier rings 42, 43, the inner surfaces of which engage the rollers so that the rings are freely and independently rotatable relative to the shell 10. On the outer surfaces of the carrier rings are secured, by welding or otherwise, segments 45, 46 which are designed to have sufficient moment of inertia or corrective unbalance at predetermined speeds to correct or neutralize the unbalance of the propeller shaft assembly, as hereinafter described.

In order to arrest the motion of the carrier rings and their associated segments relative to the propeller assembly, a clutch mechanism is provided which is operable from a remote point within the hull, through hydraulic pressure. The clutch mechanism includes two shoes each comprising a flange 48 and an inturned web 50. The webs are pivoted by means of shafts 52 to the plates 28, 29. Each of the shoes carries on its outer surface a strip 54 of brake lining material.

The cylinder 32 houses a retracting mechanism of any suitable design. As shown, the retracting mechanism comprises pistons 55 for drawing inwardly two plungers 56 which connect the pistons to the respective ends of the shoes. Compression springs 58 are interposed between the cylinder and the ends of the shoes and normally tend to apply the clutch with such force as to positively prevent rotation of the carrier rings relative to the other elements. Power is supplied to the cylinder through a conduit 60 which leads from a remote point, as the engine room of the vessel, and is connected to the cylinder through the manifold or adapter 62, which is welded or otherwise secured to the cylinder 32.

Figure 3:
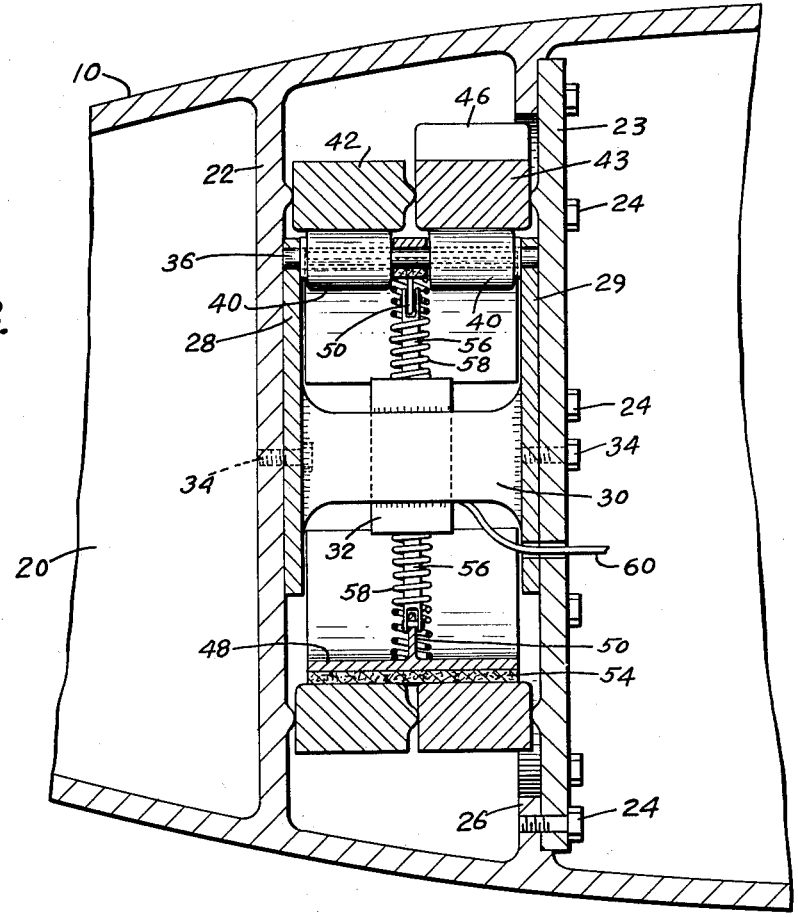
Fig. 3 is an enlarged sectional view taken on the line 3—3 of Fig. 2.

In operation, the device of Figs. 1, 2 and 3 makes use of the known principle that above resonant speed the lighter side of the rotating elements is farthest from the center of rotation. The propeller shaft is brought to a predetermined speed, which should be above the resonant speed of the system, and the clutch is then released by application of power through conduit 60, thereby permitting the unbalanced carrier rings to move by centrifugal force to positions wherein they compensate for the unbalance of the rotor in known manner. In coming closer together, the segments 45, 46 bring the center of rotation into coincidence with the geometric center of the shaft and all vibration ceases. The power is then cut off from cylinder 32, permitting springs 58 to apply the clutch, and the rotor is brought to rest.

Figure 4:
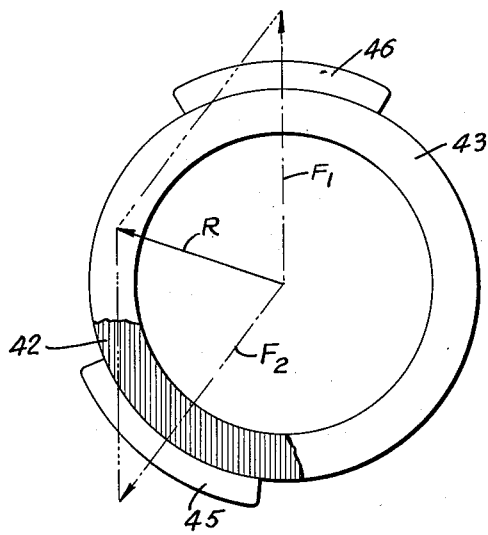
Fig. 4 is a diagram illustrating the forces effective to achieve balance in the device.

It will be clear that if the segments 45 and 46 freely assume and remain in the positions indicated in Fig. 4, they will exert centrifugal forces $F_1$ and $F_2$, which are equal to each other, and the resultant will be that indicated at R. It is assumed in this analysis that the propeller shaft does not flex appreciably during the balancing procedure. When the rotor is thus balanced, the force exerted through conduit 60 is released, and springs 53 apply the clutch, thereby retaining the segments 45 and 46 permanently in the positions to which they have moved.

Figure 5:
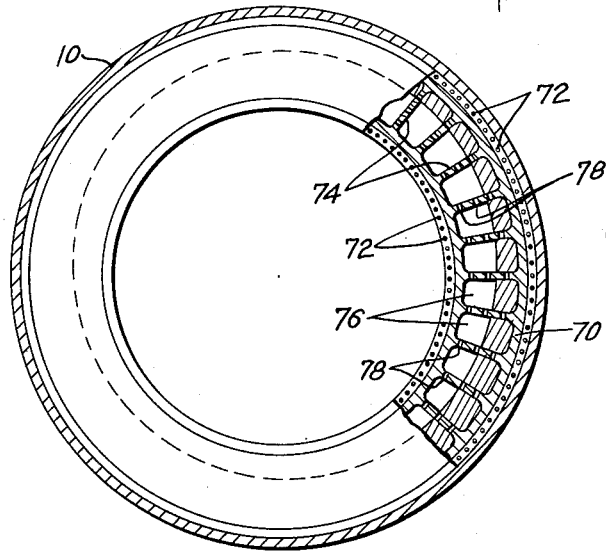
Fig. 5 is a view similar to Fig. 2 but showing a modifier form of the balancing head.

The balancing head shown in Fig. 5 comprises a hollow annular ring 70 mounted within the propeller cap shell 10 and surrounded by an electric heating element 72. The interior of the ring is divided by radial partitions 74 into compartments 76 which communicate with each other through restricted apertures 78 in the partitions. The compartments 76 are partially filled with a low melting point alloy, such as Lichtenberg fusible alloy, which melts at about 167° F., after which the ring is hermetically sealed. In the operation of this form of the invention, the propeller is brought up to a predetermined speed, and the heating element energized by current supplied and controlled from a remote point. When the alloy melts, it flows through the apertures 78 and arranges itself in some eccentric position relative to the geometric axis of the propeller mechanism, where it compensates for the unbalance in the assembly in a manner similar to that explained in connection with Figs. 1 to 4. The current is then shut off, and the alloy permitted to cool and solidify while the propeller assembly is still rotating at the predetermined speed. The metal once solidified remains in position permanently, balancing the assembly. Only a single ring, and no clutch, is required in this form of the invention.

Figure 6:
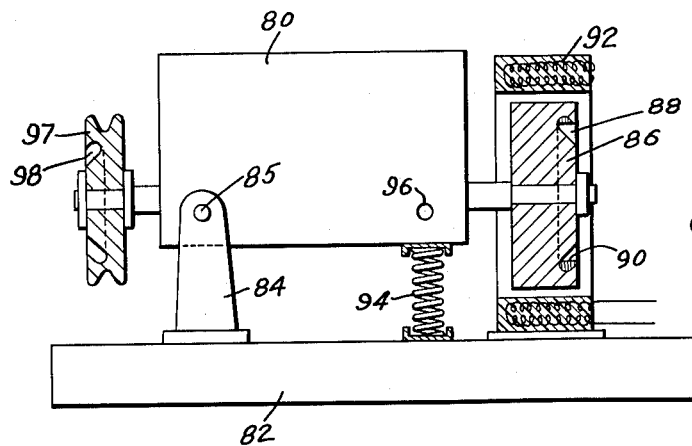
Fig. 6 is a diagrammatic view in longitudinal elevation showing a further modified form of the invention.

In the form of the invention shown in Fig. 6, an internal combustion engine indicated at 80 is mounted on a base 82 by means of a stud 84, the upper end of which is pivotally secured at 85 to the engine adjacent one of its ends. The flywheel 86 of the engine is provided with an annular groove 88 to receive molten metal 90, and a heating element 92 of induction or other suitable type is employed to maintain the flywheel and metal at desired temperature. A compression spring 94 normally maintains the engine in horizontal position. When the engine is rotated above its critical speed, the molten metal distributes itself to neutralize any unbalance at the flywheel end of the engine, and is then allowed to solidify, as described in connection with Fig. 5. The engine may then be turned end-to-end and supported by the arm 84 secured through bolt holes 96, and the process repeated with respect to the special pulley 97, which is likewise provided with a groove 98 for the reception of molten metal. Unbalance of the engine at both ends is thus corrected.

At present, engines are balanced by selecting pistons and connect-rods of equal weights, balancing the crankshaft, balancing the flywheel, and then assembling. The proposed system will create a more accurate balance and with less effort.

Obviously many modifications and variations of the present invention are possible in the light of the above teachings. It is therefore to be understood that within the scope of the appended claims the invention may be practiced otherwise than as specifically described.

What is claimed is:

1. A balancing head for a rotary shaft, comprising a shell fixed to the end of the shaft, a pair of unbalanced rings in said shell concentric with the shaft and independently rotatable relative thereto, clutch means for connecting said rings to the shaft to rotate therewith, yielding means for rendering said clutch means operative, and remote-control means for rendering said yielding means inoperative.

2. The invention defined in claim 1, wherein said last named means includes a hydraulic motor operative to release the clutch means.

References Cited in the file of this patent

UNITED STATES PATENTS

| | | |
|---|---|---|
| 1,209,730 | LeBlanc | Dec. 26, 1916 |
| 1,967,163 | Thearle | July 17, 1934 |
| 2,077,292 | Waseige | Apr. 13, 1937 |
| 2,164,900 | Campbell | July 4, 1939 |
| 2,186,199 | Martin | Jan. 9, 1940 |
| 2,285,405 | Best | June 9, 1942 |
| 2,369,679 | Matteucci | Feb. 20, 1945 |
| 2,475,302 | Adams | July 5, 1949 |
| 2,495,565 | Baker | Jan. 24, 1950 |
| 2,538,996 | Weiland | Jan. 23, 1951 |
| 2,584,222 | O'Connor | Feb. 5, 1952 |

FOREIGN PATENTS

| | | |
|---|---|---|
| 462,722 | France | Nov. 28, 1913 |
| 549,189 | Great Britain | Nov. 10, 1942 |